United States Patent
Campbell, Jr.

[15] 3,683,705
[45] Aug. 15, 1972

[54] APPARATUS FOR MOLDING HOLLOW PLASTIC ARTICLES

[72] Inventor: Robert L. Campbell, Jr., Hickory, N.C.

[73] Assignee: Automated Manufacturing Systems, Inc., Hickory, N.C.

[22] Filed: Jan. 21, 1971

[21] Appl. No.: 108,416

[52] U.S. Cl....................74/16, 18/26 RR, 74/217 R
[51] Int. Cl.........F16m 11/12, F16h 9/04, B29c 5/04
[58] Field of Search......18/26 RR; 74/217 R, 16, 660

[56] References Cited

UNITED STATES PATENTS

| | | |
|---|---|---|
| 2,487,937 | 11/1949 | Miskunas.............18/26 RR X |
| 2,629,130 | 2/1953 | Rempell...............74/660 UX |
| 3,492,697 | 2/1970 | Boyce.....................18/26 RR |
| 3,570,061 | 3/1971 | Andrews................18/26 RR |

*Primary Examiner*—Leonard H. Gerin
*Attorney*—Parrott, Bell, Seltzer, Park & Gibson

[57] ABSTRACT

An apparatus for rotating a hollow mold about a pair of mutually perpendicular axes to cast a hollow plastic article. The apparatus includes a rotatable shaft defining a first axis and which carries an L-shaped bracket at one end, with one leg of the bracket extending radially from the shaft and the second leg extending generally parallel to the shaft. A mold support member is connected to the second leg and is rotatable about a second axis which perpendicularly intersects the axis of the shaft. An electric motor is provided for rotating the shaft, bracket, and thus a supported mold about the shaft axis, and a series of pulleys and interconnecting drive belt are employed to simultaneously rotate the mold about the second axis. The interconnection between the shaft and bracket is radially adjustable such that the center of the mold can be positioned at or closely adjacent the intersection of the two axes to thereby permit an essentially balanced rotation of the bracket and mold about the first axis of the apparatus.

10 Claims, 6 Drawing Figures

Patented Aug. 15, 1972

3,683,705

INVENTOR:
ROBERT L. CAMPBELL, JR.

BY Parrott, Bell, Seltzer, Park & Gibson
ATTORNEYS

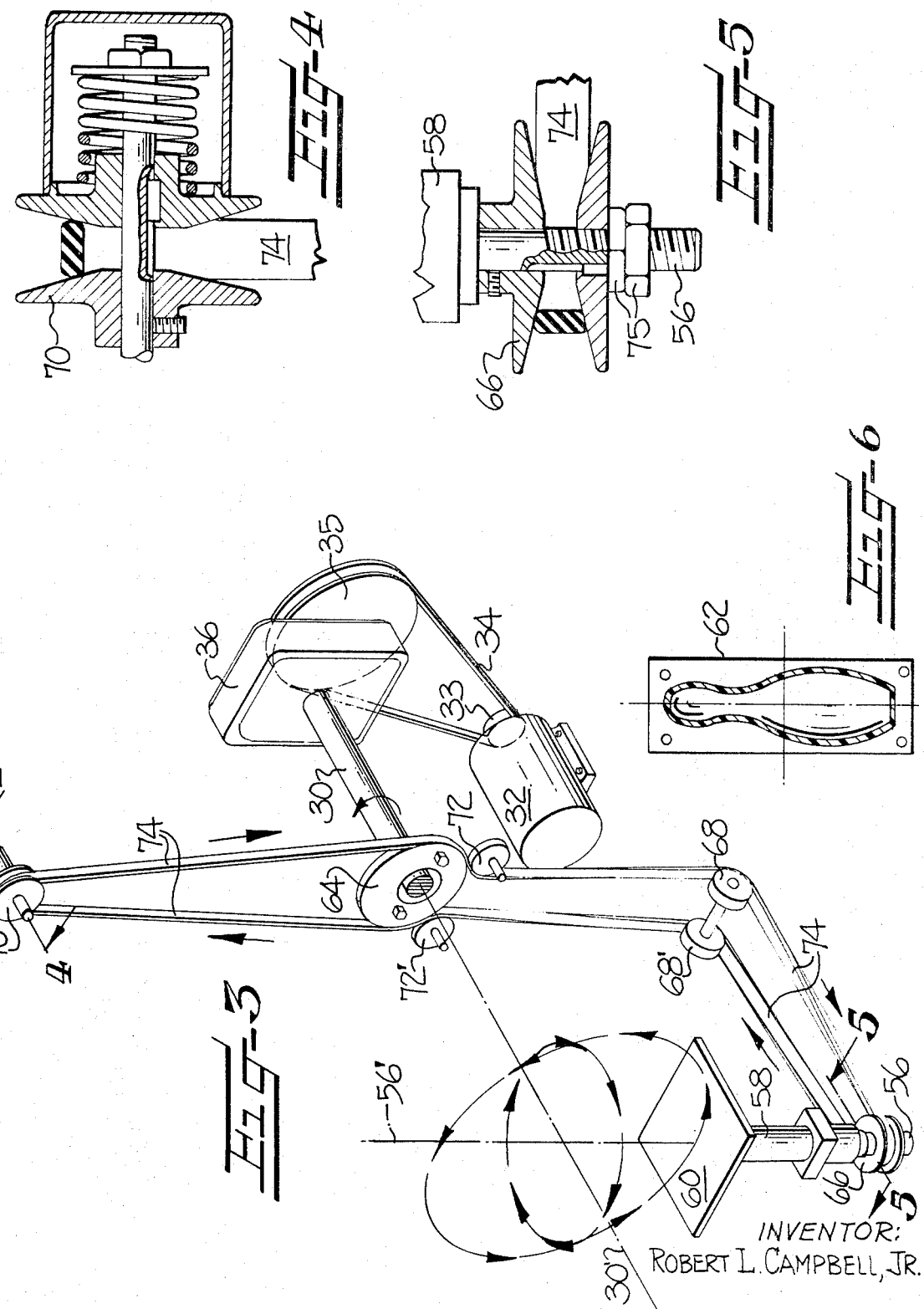

3,683,705

APPARATUS FOR MOLDING HOLLOW PLASTIC ARTICLES

The present invention relates to an apparatus for casting a hollow article from a thermoplastic or thermosetting resin or the like. More particularly, the invention relates to an apparatus for rotating molds of various shapes and sizes about a pair of intersecting axes to cast various hollow plastic objects.

In producing hollow plastic articles, such as plastic figurines, lamp bases or toys, it is conventional practice to deposit a measured charge of a suitable plastic resin in a hollow sectional mold, and to then rotate the mold about a pair of mutually perpendicular axes such that the charge is distributed as a layer over the entire inner surface of the mold cavity. Upon setting of the resin, the mold is opened to permit removal of the finished product.

While the above molding process is generally satisfactory the presently known apparatus used in carrying out the process have proven to be unduly expensive, and not readily adaptable for molding articles of varying sizes and shapes. In particular, machines adapted to accommodate molds of various sizes and configurations must be of relatively heavy construction in order to adequately support the larger molds. In other words, when the larger molds are positioned on conventional machines, the operation thereof will be unbalanced and a heavy supporting structure is required to control resulting vibrations or movement of the machine. This necessary supporting structure increases the cost and weight of the apparatus, and significantly limits its portability.

It is accordingly an object of the present invention to provide a relatively lightweight apparatus for rotating a hollow mold about a pair of axes, and which is adapted to selectively mount molds of various sizes and shapes and to rotate the same under essentially balanced conditions.

It is a more specific object of the present invention to provide an apparatus for simultaneously rotating a mold about a pair of mutually perpendicular axes and having provision for positioning the center of the mold at or closely adjacent the intersection of the axes to thereby provide for the balanced operation of the machine whereby the heavy supporting structure employed in present apparatus of this type may be eliminated.

It is another object of this invention to provide a machine for molding a hollow plastic article which is simple in design and relatively inexpensive to manufacture.

It is a further object of the present invention to provide an apparatus of the described type having provision for adjusting the relative speeds of rotation about the two axes.

These and other objects and advantages of the present invention are achieved in the embodiment illustrated herein by the provision of an apparatus which includes a rotatable shaft, and an L-shaped bracket connected at one end of the shaft. One leg of the bracket extends radially from the shaft and is adjustably connected thereto such that the radial extent thereof may be varied, and a second leg is connected to the radial extremity of the first leg and extends generally parallel to the shaft. The second leg includes means for supporting the mold for rotation about a second axis substantially perpendicular to the axis of the shaft, an means are provided for rotating the shaft and connected mold about the shaft axis and for simultaneously rotating the mold about the second axis. By varying the radial extent of the bracket first leg, the first axis can be made to pass substantially through the center of the mold to thereby obtain essentially balanced rotation.

Some of the objects and advantages of the invention having been stated, others will appear as the description proceeds, when taken in connection with the accompanying drawings, in which FIG. 1 is a perspective view of an apparatus embodying the features of the present invention;

FIG. 3 is a fragmentary perspective view illustrating the drive means of the apparatus shown in FIG. 1;

FIG. 4 is a sectional view taken substantially along the line 4—4 of FIG. 3;

FIG. 5 is a sectional view taken substantially along the line 5—5 of FIG. 3;

FIG. 6 is a sectional view of a typical hollow mold suitable for use with the present invention.

Figures 1, 2:
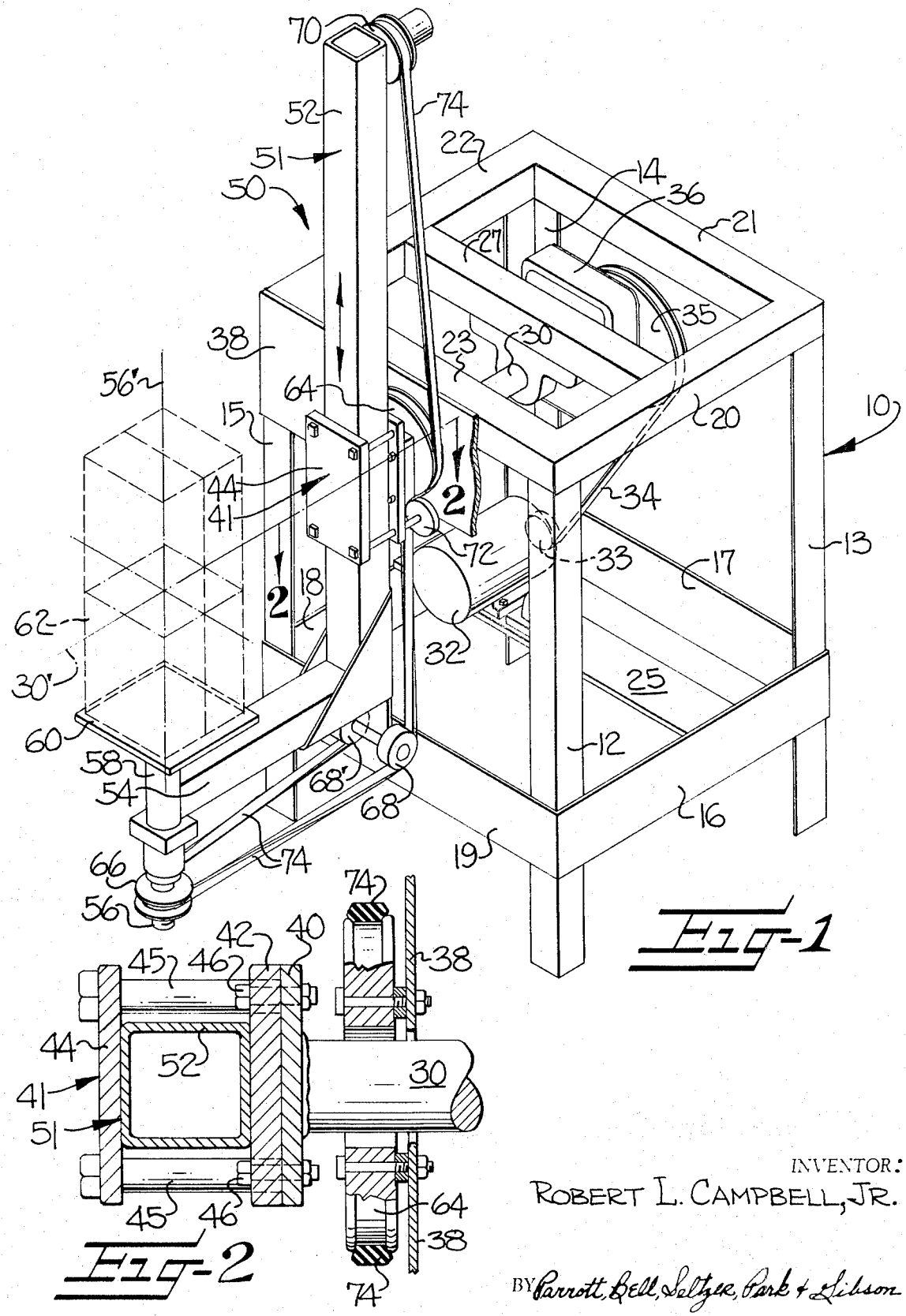
FIG. 2 is a fragmentary sectional view taken substantially along the line 2—2 in FIG. 1.

Referring more specifically to the drawings, the illustrated apparatus includes a generally rectangular supporting frame 10 comprising four vertical corner posts 12, 13, 14, 15, four lower interconnecting members 16, 17, 18, and 19, and four upper interconnecting members 20, 21, 22, and 23 defining a horizontal top surface. A lower support member 25 is connected between the lower members 16 and 18, and an upper support member 27 extends between members 20 and 22.

A horizontal shaft 30 is mounted by suitable bearings (not numbered) to the members 23 and 27, and is rotatably driven by a variable speed electric motor 32 mounted on the member 25. More particularly, the motor 32 includes a pulley 35 which acts to rotate the belt 34 and pulley 35. The pulley 35 in turn is connected to the shaft 30 through the reduction gear 36.

As best seen in FIG. 2, the shaft 30 extends through a plate 38 carried at the front of the apparatus, and has a transverse flange 40 connected thereto, as by welding. A mounting frame 41 is releasably connected to the flange 40 and includes a rear plate 42, a front gib 44, and four interconnecting bolts 45. The mounting frame 41 is releasably connected to the flange 40 by the bolts 46 such that frames of differing size may be readily attached to the shaft 30.

A turret 50 is connected to one end of the shaft 30 and is secured thereto by the mounting frame 41. The turret includes an L-shaped bracket 51 having a first leg 52 extending radially from the shaft and a second leg 54 perpendicularly connected at one end of the first leg so as to extend parallel to the shaft 30. The remote end of the second leg mounts a second rotatable shaft 56 which defines an axis 56' which perpendicularly intersects the axis 30' defined by the shaft 30. The shaft 56 is connected to the leg 54 by a suitable bearing 58 and mounts a mold supporting platform 60 which is adapted to retain the hollow mold 62.

The structure for rotating the shaft 56 and platform 60 about the axis 56' includes a first pulley 64 coaxially positioned about the shaft 30 immediately adjacent the flange 40, note FIG. 2. The pulley 64 is fixedly mounted to plate 38 and thus is non-rotatable. In addition, a second pulley 66 is attached to shaft 56, a pair of guide pulleys 68, 68' are attached to the bracket adjacent to the interconnection of the two legs, a guide pulley 70 is attached adjacent the opposite end of the leg 52, and another pair of guide pulleys 72, 72' are carried by the rear plate 42 of the mounting frame. An endless belt 74 is trained about all of these pulleys in the manner shown in FIG. 3.

The effective diameter of the pulley 66 is designed to be adjustable by rotation of the nut 75 as shown in FIG. 5. By this arrangement, the relative rotational speeds of the shafts 30 and 56 may be varied. To compensate for any change in the effective length of belt 74 resulting from a change in diameter of pulley 66, the pulley 70 may also be made adjustable by the spring loaded arrangement own in FIG. 4. The structure of the pulleys 66 and 70 is well known in the art and will therefore not be further described herein.

In operation, a measured charge of a suitable plastic resin, such as a conventional exothermic thermosetting resin, is deposited within the hollow sectional mold 62, and mold is secured to the platform 60. A suitable retaining structure (not shown) for securing the mold to the platform is utilized to retain the mold in position during the casting operation.

To initiate the casting operation, the motor 32 is energized to rotate the shaft 30 and bracket 51 about the axis 30'. Simultaneously, the shaft 56 will be rotated about the axis 56' by the belt 74. More particularly, the pulley 64, being stationary, will cause the belt 74 to be rotated about the various guide pulleys as the bracket 51 is rotated and thus to rotate the pulley 66. In order to change the relative speeds of rotation about the two axes, it is merely necessary to either increase or decrease the effective diameter of pulley 66 as described above. Thus upon a decrease in the effective diameter the shaft 56 will rotate faster, and upon an increase it will rotate slower.

In order to insure the balanced operation of the machine, the radial extent of the bracket first leg 52 may be adjusted until the axis 30' is positioned to intersect the approximate center of the mold 62. In this regard, it will be appreciated that positioning the axis 30' to intersect the center of the mold will not necessarily exactly balance the bracket 51 and mold. However, it has been found that so positioning these members will provide a sufficient degree of balance is most applications, and thus the center of the mold may be used as a convenient point of reference for this purpose. In addition, when the mold is centered about the axis 30' and also about the axis 56', the rotation of the mold will be essentially balanced which facilitates the quick and even distribution of the plastic in the mold cavity.

From the above description, it will be apparent that by providing for the essentially balanced rotation of the bracket 51 and mold 62 on the machine, the heavy supporting structure required in present machines of this type may be eliminated. Thus the applicant has provided a small, lightweight, and relatively portable machine for rotating large molds of a type which presently require a much heavier and larger machine to effect rotation. By way of specific illustration, a typical machine embodying the present invention stands 47 inches high, the interconnecting members 20–23 form a rectangle measuring 29 inches b 32 inches, the first leg 52 measures 37 inches, and the second leg 54 measures out 22 inches. This machine is able to rotate a mold up to 60 inches in height and 38 inches in diameter without significant movement or vibration when the center of the mold is positioned at or closely adjacent the axis 30'. In operation, the above machine rotates the mold at a speed of about 9 rpm about the axis 30', and a speed of about 27 rpm about the axis 56'.

In the drawings and specification, there has been set forth a preferred embodiment of the invention, and although specific terms are employed, they are used in a generic and descriptive sense only and not for purposes of limitation.

What is claimed is:

1. An apparatus for rotating molds of various sizes about a pair of intersecting axes to cast a hollow plastic object or the like comprising
   a rotatable shaft defining a first axis,
   a turret rotatable about said first axis and including a mold support means rotatable about a second axis perpendicular to and intersecting said first axis, and
   means drivingly connecting said turret to said shaft for rotating said mold support means about said first and second axes and including means for adjusting said mold support means radially of said first axis to vary the position of a mold supported thereby relative to said first axis.

2. The apparatus as defined in claim 1 wherein said turret further includes an L-shaped bracket having a first leg extending radially from said shaft and a second leg connected to said first leg and extending generally parallel to said shaft, and said mold support means being carried by said second leg.

3. The apparatus as defined in claim 2 wherein said means for adjusting said mold support means comprises means for adjustably connecting said first leg to said shaft such that the radial extent thereof may be varied.

4. An apparatus for rotating molds of various sizes about a pair of intersecting axes to cast a hollow plastic object or the like comprising
   a first rotatable shaft defining a first axis,
   an L-shaped bracket having a first leg extending radially from said shaft and a second leg connected to said first leg and extending generally parallel to and spaced from said shaft,
   means for adjustably connecting said first leg to said first shaft such that the radial extent thereof may be varied,
   means for rotating said shaft and connected bracket about said first axis,
   means for mounting a mold to said second leg of said bracket and including a second rotatable shaft defining a second axis perpendicularly intersecting said first axis, and
   means for rotating said second shaft about said second axis such that a mold mounted on said bracket may be simultaneously rotated about said fist and second axes and whereby a mold may be adjusted radially in relation to said first axis by adjusting the radial extent of said first leg.

5. The apparatus as defined in claim 4 wherein said means for rotating said second shaft comprises a first pulley mounted coaxially about said first axis, a second pulley carried by and coaxial with said second shaft, and an endless drive belt operatively extending therebetween.

6. The apparatus as defined in claim 5 wherein said first pulley is fixedly mounted for non-rotation.

7. The apparatus as defined in claim 5 wherein said means for rotating said second shaft further comprises first guide pulley means attached to said bracket at one side of said first pulley and adjacent the connection of said first and second bracket legs for guiding said drive belt between said first and second pulleys, and second guide pulley means attached to the bracket first leg at the opposite side of said first pulley for maintaining the effective length of said drive belt when the radial extent of said first leg is varied.

8. The apparatus as defined in claim 7 wherein said means for adjustably connecting said first leg to said first shaft comprises a transverse plate connected to one end of said first shaft, a gib carried in spaced parallel relation to said plate to receive said first bracket leg therebetween, and means for releasably clamping said first leg between said gib and said plate.

9. The apparatus as defined in claim 8 wherein said first pulley is positioned adjacent said plate, and further comprising third guide pulley means carried by said plate for guiding said endless belt about the periphery of said first pulley to assure frictional engagement therebetween.

10. The apparatus as defined in claim 9 wherein the effective diameter of said second pulley is adjustable whereby the relative rotational speed of said second shaft may be changed relative to that of said first shaft.

* * * * *